US012285120B2

(12) United States Patent
Smith et al.

(10) Patent No.: US 12,285,120 B2
(45) Date of Patent: Apr. 29, 2025

(54) DISPLAY SYSTEMS FOR SECURING DISPLAY CONTAINERS

(71) Applicant: ALL PLASTIC, INC., Rancho Cordova, CA (US)

(72) Inventors: William Thomas Smith, Fair Oaks, CA (US); Cheryl Ann Smith, Fair Oaks, CA (US)

(73) Assignee: ALL PLASTIC, INC., Rancho Cordova, CA (US)

( * ) Notice: Subject to any disclaimer, the term of this patent is extended or adjusted under 35 U.S.C. 154(b) by 0 days.

(21) Appl. No.: 18/402,420

(22) Filed: Jan. 2, 2024

(65) Prior Publication Data

US 2024/0237834 A1 Jul. 18, 2024

Related U.S. Application Data

(60) Provisional application No. 63/488,805, filed on Mar. 7, 2023, provisional application No. 63/439,735, filed on Jan. 18, 2023.

(51) Int. Cl.

*A47F 3/00* (2006.01)
*A47F 7/024* (2006.01)
*E05B 73/00* (2006.01)

(52) U.S. Cl.

CPC .............. *A47F 3/002* (2013.01); *A47F 7/024* (2013.01); *E05B 73/00* (2013.01)

(58) Field of Classification Search

CPC ........... A47F 3/002; A47F 7/024; E05B 73/00
See application file for complete search history.

(56) References Cited

U.S. PATENT DOCUMENTS

| | | | | | |
|---|---|---|---|---|---|
| 1,047,366 | A * | 12/1912 | Alston | A47B 81/005 | 211/67 |
| 3,964,603 | A * | 6/1976 | Sandler | A47F 7/024 | 206/566 |
| 4,486,169 | A | 12/1984 | Lewis | | |
| D305,586 | S | 1/1990 | Wombacher | | |
| D306,964 | S | 4/1990 | Zupancic | | |
| 5,685,436 | A * | 11/1997 | Davet | A47F 7/024 | 211/85.5 |
| D410,052 | S | 5/1999 | Davis et al. | | |
| 5,931,549 | A * | 8/1999 | Lindberg | A47B 21/00 | 312/26 |
| D599,193 | S | 9/2009 | Meyer et al. | | |
| D599,194 | S | 9/2009 | Meyer et al. | | |
| D608,183 | S | 1/2010 | Meyer et al. | | |
| 7,922,267 | B2 * | 4/2011 | Gevaert | A47B 21/0073 | 108/50.01 |

(Continued)

*Primary Examiner* — Ko H Chan
(74) *Attorney, Agent, or Firm* — WOMBLE BOND DICKINSON (US) LLP

(57) ABSTRACT

A display system for securing display containers includes (a) a worksurface having an aperture passing therethrough; and (b) a display insert detachably mountable in the aperture. The display insert includes: (i) a panel for covering the aperture, the panel having at least one tether port extending therethrough; (ii) a tether system mounted under the panel and including a plurality of retractable tethers extendable through the at least one tether port for attachment to respective display containers positionable atop the panel; and (iii) a locking mechanism for selectively locking and unlocking the panel to and from the worksurface.

26 Claims, 9 Drawing Sheets

(56) References Cited

U.S. PATENT DOCUMENTS

| | | | | |
|---|---|---|---|---|
| 7,926,430 | B2 * | 4/2011 | Bakker | A47B 37/00 108/50.02 |
| 8,074,581 | B2 * | 12/2011 | Epstein | G06F 3/0481 108/50.01 |
| 8,292,097 | B2 | 10/2012 | Goldberg | |
| 8,360,373 | B2 * | 1/2013 | Johnson | H05K 7/026 340/568.1 |
| 8,814,128 | B2 | 8/2014 | Trinh et al. | |
| D729,043 | S | 5/2015 | Poppell | |
| D759,466 | S | 6/2016 | Tonthat et al. | |
| 9,615,677 | B2 * | 4/2017 | Trinh | A47F 5/0043 |
| 9,630,747 | B2 | 4/2017 | Smith | |
| D789,180 | S | 6/2017 | Webb | |
| D848,819 | S | 5/2019 | French | |
| D880,462 | S | 4/2020 | Nakamura | |
| D884,461 | S | 5/2020 | Allen et al. | |
| D939,933 | S | 1/2022 | Campbell | |
| D953,183 | S | 5/2022 | Dong et al. | |
| D965,355 | S | 10/2022 | Fink et al. | |
| D1,012,682 | S | 1/2024 | Huang | |
| D1,013,382 | S | 2/2024 | Rutsche et al. | |
| D1,019,348 | S | 3/2024 | Palmer et al. | |
| D1,020,827 | S | 4/2024 | Ando et al. | |
| 2002/0030025 | A1 * | 3/2002 | Sipe | E05B 73/00 248/552 |
| 2006/0000955 | A1 * | 1/2006 | Cvek | A47B 21/007 248/161 |
| 2007/0152545 | A1 * | 7/2007 | Tranter | A47B 81/061 312/30 |
| 2011/0062294 | A1 * | 3/2011 | Johnson | F16M 11/00 248/161 |
| 2014/0027390 | A1 | 1/2014 | Reynolds et al. | |
| 2014/0120481 | A1 | 5/2014 | Buchbinder | |
| 2015/0208826 | A1 | 7/2015 | Yang et al. | |
| 2020/0113353 | A1 | 4/2020 | Bigioni et al. | |

* cited by examiner

DISPLAY SYSTEMS FOR SECURING DISPLAY CONTAINERS

CROSS-REFERENCE TO RELATED APPLICATIONS

This application claims the benefit of U.S. Provisional Application No. 63/439,735, filed on Jan. 18, 2023, and U.S. Provisional Application No. 63/488,805, filed on Mar. 7, 2023, each of which is hereby incorporated herein by reference in its entirety.

FIELD

The present specification relates generally to display of articles, and more specifically, to display systems for securing display containers.

BACKGROUND

U.S. Pat. No. 9,630,747 B2 (Smith et al.) discloses a container for displaying, visualizing, and aroma sampling botanical materials such as tea, cannabis, and the like including a container body, lid, and lens. The container body is shaped to define a mounting projection wherein a sample, such as a botanical sample, may be held. The container body and lid form an airtight seal. A sample may be visualized through the lens. In a preferred embodiment, the lid is shaped to define scent openings permitting aroma sampling of a sample contained within.

SUMMARY

The following summary is intended to introduce the reader to various aspects of the applicant's teaching, but not to define any invention.

According to some aspects, a countertop display system for securing display containers includes: (a) a countertop mountable atop a cabinet in a generally horizontal orientation, the countertop having a countertop underside surface for facing an interior of the cabinet, a worksurface opposite the underside surface for facing an outside environment, and an aperture passing vertically through the countertop from the worksurface to the underside surface; (b) a display insert detachably mountable in the aperture of the countertop. The display insert includes: (i) a panel positionable in the aperture generally parallel with the countertop for covering the aperture, the panel having a bottom surface for facing the interior of the cabinet, a top surface opposite the bottom surface for facing the outside environment, and at least one tether port passing vertically through the panel from the top surface to the bottom surface; (ii) a tether system mounted under the panel for fastening the display containers to the panel, the tether system including a plurality of retractable tethers extendable through the at least one tether port to the outside environment for attachment to respective display containers, each tether permitting limited movement of a respective display container away from the panel to facilitate viewing of one or more articles in the display container, and urging the display container back toward the top surface of the panel; and (iii) a locking mechanism configurable between a locked position in which the panel is securely locked to the countertop when in the aperture to prevent detachment of the panel from the countertop, and an unlocked position in which the panel is unlocked from the countertop to permit removal of the panel from the aperture for transporting the panel, tether system, and display containers away from the countertop.

In some examples, when the panel is in the aperture, the top surface of the panel is generally flush with the worksurface of the countertop.

In some examples, the countertop has a ledge projecting horizontally into the aperture and recessed downwardly from the worksurface for supporting the panel when received in the aperture.

In some examples, the panel is positionable in the aperture by inserting the panel into the aperture from above, and the panel is removable from the aperture by lifting the panel vertically out from the aperture.

In some examples, the aperture has an aperture area and the worksurface has a surface area greater than the aperture area.

In some examples, the panel extends lengthwise along a panel axis, and the at least one tether port comprises a panel slot extending continuously along the panel axis and through which the plurality of tethers extend.

In some examples, each tether comprises a retraction mechanism under the panel and a tether line extendable from the retraction mechanism through the at least one tether port for attachment to a respective container, the tether line urged back into the retraction mechanism for returning the display container to the panel.

In some examples, the locking mechanism comprises at least one latch movably coupled to one of the panel and the countertop and a respective strike surface fixed to the other one of the panel and the countertop, the latch clear of the strike surface when the locking mechanism is in the unlocked configuration and positioned for engagement with the strike surface to inhibit detachment of the panel when the locking mechanism is in the locked configuration.

In some examples, the panel extends lengthwise along a panel axis between opposed ends, and the locking mechanism comprises a pair of latches and respective strike surfaces, each latch and respective strike surface positioned adjacent a respective end of the panel.

In some examples, the latch is coupled to the panel and the strike surface is fixed to the countertop.

According to some examples, a display system for securing display containers includes: (a) a worksurface having an aperture passing therethrough; and (b) a display insert detachably mountable in the aperture. The display insert includes: (i) a panel for covering the aperture, the panel having at least one tether port extending therethrough; (ii) a tether system mounted under the panel and including a plurality of retractable tethers extendable through the at least one tether port for attachment to respective display containers positionable atop the panel; and (iii) a locking mechanism for selectively locking and unlocking the panel to and from the worksurface.

In some examples, the panel is positionable in the aperture generally flush with the worksurface.

In some examples, the panel is positionable in the aperture by inserting the panel into the aperture from above, and the panel is removable from the aperture by lifting the panel vertically out from the aperture.

In some examples, the aperture has an aperture area and the worksurface has a surface area greater than the aperture area.

In some examples, the panel extends lengthwise along a panel axis, and the at least one tether port comprises a panel slot extending along the panel axis and through which the plurality of tethers extend. In some examples, each tether is adjustably coupled to the panel at an axial position, the axial position adjustable along the panel axis.

According to some aspects, a display insert detachably mountable in an aperture of a worksurface for securing display containers includes: (a) a panel for covering the aperture, the panel extending lengthwise along a panel axis and having at least one tether port extending therethrough; (b) a tether system mounted to an underside of the panel, the tether system including a plurality of retractable tethers spaced apart from each other along the panel axis and extendable through the at least one tether port for attachment to respective display containers; and (c) a locking mechanism coupled to the panel for selectively locking and unlocking the panel to and from the worksurface when the panel is positioned in the aperture.

In some examples, the at least one tether port comprises a panel slot extending continuously along the panel axis and through which the plurality of tethers extend.

In some examples, the display insert includes a slot cover extending along and across the slot to limit visibility through the slot while accommodating extension of the tethers therethrough. In some examples, the slot cover comprises a strip brush under the panel and having bristles projecting transversely across the slot and between which the tethers are extendable.

In some examples, the locking mechanism has at least one latch movably coupled to the panel for engagement with a strike surface fixed relative to the worksurface to lock the panel to the worksurface, and movable clear of the strike surface to unlock the panel from the worksurface.

In some examples, the display insert includes the display containers, each display container attached to a respective tether atop the panel.

In some examples, the panel extends lengthwise along a panel axis, and each tether is adjustably coupled to the panel at an axial position, the axial position adjustable along the panel axis.

In some examples, each tether includes a respective tether lock operable to lock and unlock the tether relative to the panel to inhibit and permit, respectively, adjustment of the axial position along the panel axis.

In some examples, the tether system includes a track under the panel and extending along the panel axis, each tether slidably coupled to the track and selectively translatable therealong relative to the panel for adjustment of the axial position.

In some examples, the track has a track slot extending along the panel axis, and each tether has a guide received in the track slot for guiding translation of the tether along the track.

In some examples, each retractable tether is detachably coupled to the panel to permit detachment and reattachment of each tether from and to the panel for adjusting a total quantity of tethers coupled to the panel.

According to some aspects, a display system includes: (a) a housing having an opening to an interior of the housing; (b) a panel positionable over the opening, the panel having a slot passing therethrough between the interior and an exterior environment, the slot extending lengthwise along a panel axis; (c) a locking mechanism coupled to the panel for selectively locking and unlocking the panel relative to the housing; and (d) a tether system attached to the panel, the tether system including a plurality of retractable tethers spaced apart from each other along the axis, each tether including a retraction mechanism in the interior and a tether line extendable from the retraction mechanism through the slot for attachment to a respective display container in the exterior environment, each retraction mechanism adjustably coupled to the panel to permit adjustment of an axial position of each tether along the panel axis.

According to some aspects, an adjustable display assembly includes (a) a cover having a slot passing therethrough, the slot extending lengthwise along an axis; and (b) a tether system attached to the cover. The tether system including a plurality of retractable tethers spaced apart from each other along the axis. Each tether includes a retraction mechanism on a first side of the cover and a tether line extendable from the retraction mechanism through the slot for attachment to a respective display container positionable on a second side of the cover opposite the first side. Each retraction mechanism is adjustably coupled to the cover to permit adjustment of an axial position of each tether along the axis.

In some examples, the tether system includes a track on the first side of the cover and extending along the axis, each retraction mechanism slidably coupled to the track and selectively translatable therealong relative to the cover for adjustment of the axial position.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses, systems, or processes will be described below to provide an example of an embodiment of each claimed invention. No embodiment described below limits any claimed invention and any claimed invention may cover systems, processes, or apparatuses that differ from those described below. The claimed inventions are not limited to systems, apparatuses, or processes having all of the features of any one system, apparatus, or process described below or to features common to multiple or all of the systems, apparatuses, or processes described below. It is possible that a system, apparatus, or process described below is not an embodiment of any claimed invention. Any invention disclosed in a system, apparatus, or process described herein that is not claimed in this document may be the subject matter of another protective instrument, for example, a continuing patent application, and the applicants, inventors, or owners do not intend to abandon, disclaim, or dedicate to the public any such invention by its disclosure in this document.

In retail or other environments, it may be desirable or necessary to display articles for sale in secure display containers. The containers can be locked and/or tamper-proof to prevent patrons from touching the articles being displayed therein. The containers may also be fastened at a display location through, for example, a tether to allow patrons to handle and manipulate the display containers for viewing and/or sampling an aroma of the articles contained therein while deterring theft or misplacement of the containers.

The present application discloses display systems for securely displaying articles in secured display containers. The display containers can be fastened to a worksurface (e.g. of a countertop or other generally immobile fixture) at a display location. The display systems of the present disclosure can allow for convenient detachment and reattachment of the display containers for transport away from and back to the display (or other) location. This can facilitate, for example, servicing, replacement, and/or more secure storage (e.g. during store closure, overnight, etc.) of the display containers and/or articles contained therein. The articles can include, for example, valuable botanical specimens such as, for example, cannabis specimens.

Figure 1:
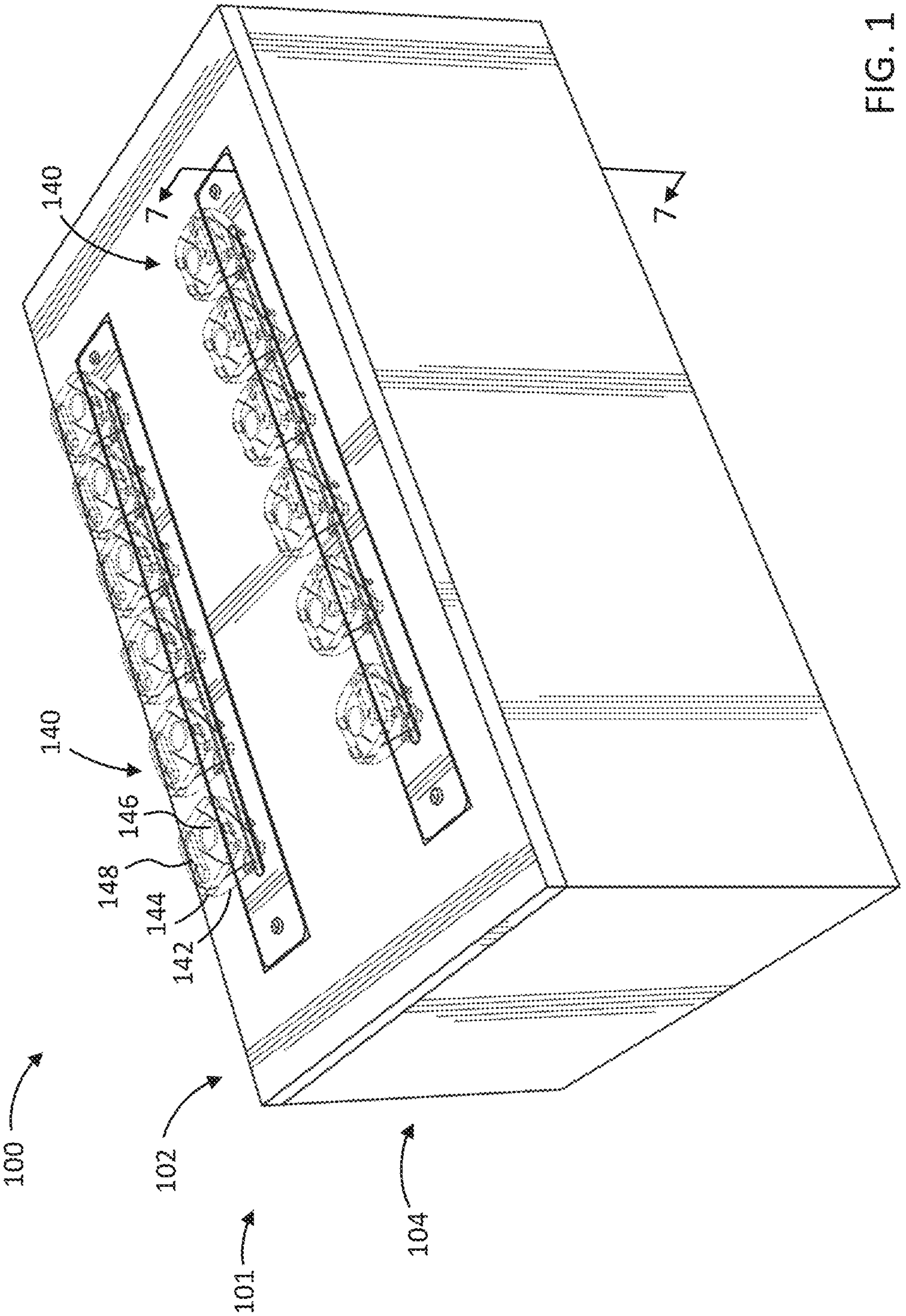
FIG. 1 is a perspective view of an example display system.
Figure 2:
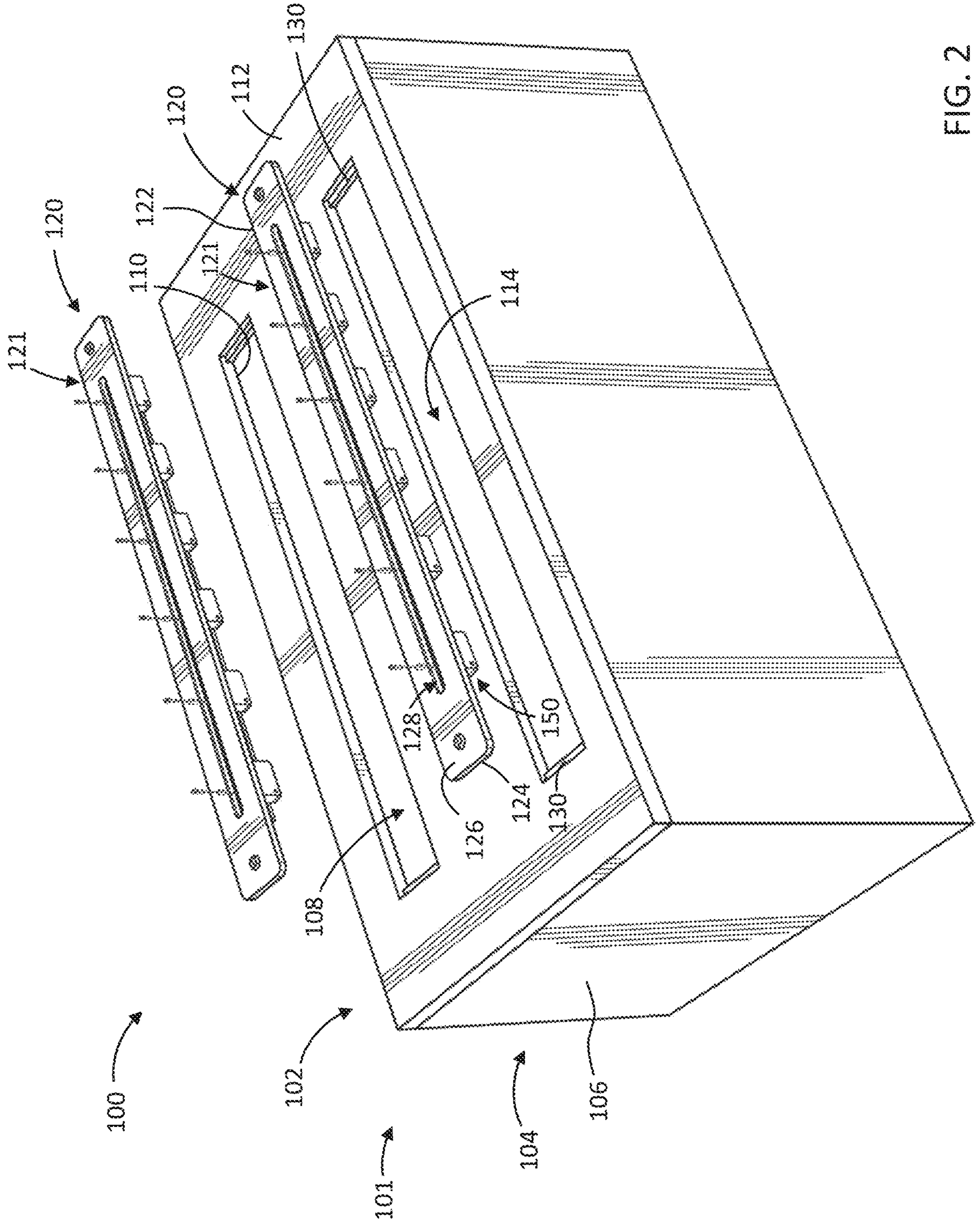
FIG. 2 is an exploded view of portions of the display system of FIG. 1.

Referring to FIG. 1, an example display system 100 for securing display containers is shown. In the example illustrated, the display system 100 includes a housing 101 comprising a countertop 102 mounted atop a cabinet 104. Referring to FIG. 2, in the example illustrated, the cabinet 104 has a sidewall 106 extending vertically between a bottom and a top of the cabinet 104, and horizontally enclosing an interior 108 of the housing 101. In the example illustrated, the interior 108 is open to the top of the cabinet 104, and the countertop 102 is mountable over the top of the cabinet 104 to cover the interior 108 from above.

In the example illustrated, the cabinet 104 is in the form of a free-standing cabinet. In some examples, a portion of the interior 108 of the cabinet can be used to store, for example, articles on display by the display system 100 and/or corresponding merchandise available for purchase. In some examples, the cabinet can optionally include one or more lockable doors and/or drawers (e.g. forming part of the sidewall 106) for providing access to the interior 108 to facilitate such storage. In some examples, the cabinet and/or countertop can be wall-mountable.

In the example illustrated, the countertop 102 has an underside surface 110 facing the interior 108 of the housing 101, a worksurface 112 opposite the underside surface 110 and facing an outside environment, and at least one aperture 114 passing through the countertop 102 between the underside surface 110 and the worksurface 112.

In the example illustrated, the countertop 102 is oriented generally horizontally, and the worksurface 112 is generally planar and lies in a horizontal plane. The worksurface 112 is directed upwardly and extends around the aperture 114. The worksurface 112 can be used to, for example, display merchandise, accessories, marketing and/or informational content relating to the articles on display, etc. In the example illustrated, the worksurface 112 extends completely around the aperture 114. In the example illustrated, the worksurface 112 is defined by a worksurface area, and the aperture 114 is defined by an aperture area. The worksurface area is greater than the aperture area to provide adequate space around the aperture 114 for display and/or aesthetic purposes.

In the example illustrated, the display system 100 further includes at least one display insert 120 detachably mountable in the aperture 114 of the countertop 102. In the example illustrated, the display system 100 includes a pair of display inserts 120 detachably mountable in respective apertures 114 on opposite sides of the countertop 102. Each display insert 120 includes a cover 121 for covering the aperture 114. In the example illustrated, the cover 121 comprises a panel 122 positionable in the aperture 114 generally parallel with the countertop 102 (and worksurface 112) for covering the aperture 114. In the example illustrated, the panel 122 is positionable in the aperture 114 by inserting the panel 122 into the aperture 114 from above, and removable from the aperture 114 by lifting the panel 122 vertically out from the aperture 114. In the example illustrated, the panel 122 has a bottom surface 124 facing the interior 108 of the housing, a top surface 126 opposite the bottom surface 124 and facing the outside environment, and at least one tether port 128 extending vertically through the panel 122 between the panel bottom and top surfaces 124, 126. In the example illustrated, the panel 122 is sized and shaped for positioning in the aperture 114 in close fit within a periphery of the aperture 114.

Figure 7:
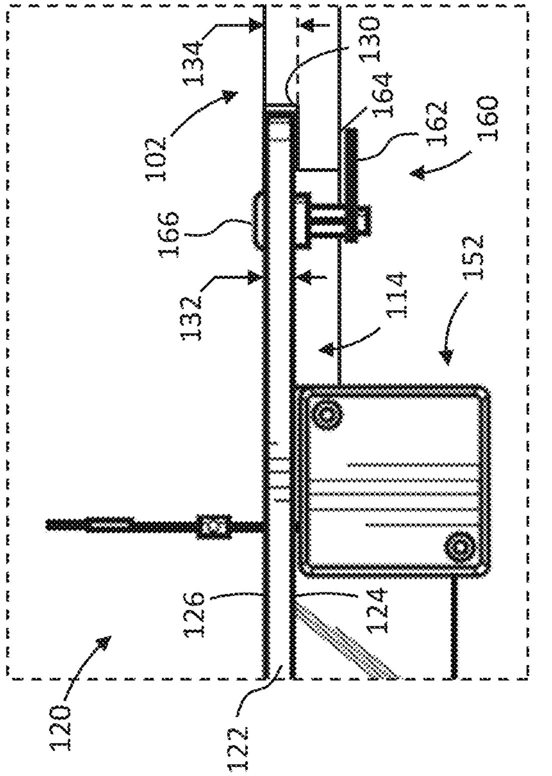
FIG. 7 is a cross-sectional view of portions of the display system, taken along line 7-7 in FIG. 1.
Figure 6:
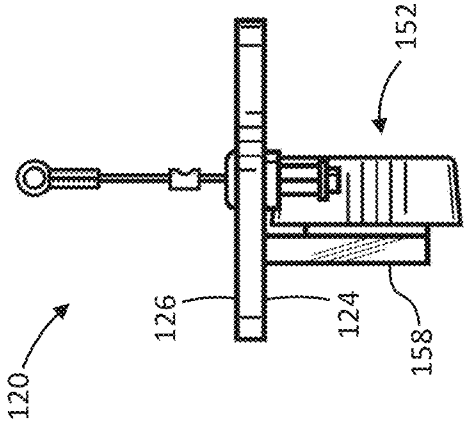
FIG. 6 is a side elevation view of the insert portion of FIG. 3.

In the example illustrated, when the panel 122 is received in the aperture 114, the top surface 126 of the panel 122 is generally parallel and flush with the worksurface 112. In the example illustrated, the countertop 102 has a ledge 130 projecting horizontally into the aperture 114 and recessed downwardly from the worksurface 112 for supporting the panel 122 generally flush with the worksurface 112 when the panel is seated in the aperture 114. Referring to FIG. 7, in the example illustrated, the panel 122 has a panel thickness 132 between the top and bottom surfaces 124, 126 of the panel 122, and the ledge 130 is recessed downwardly from the worksurface 112 by an offset 134 generally equal to the panel thickness 132 for positioning the top surface 126 of the panel 122 generally flush with the worksurface 112. In the example illustrated, the panel 122 extends lengthwise along a panel axis 136 between opposite ends of the panel 122. The countertop 102 has a pair of the ledges 130 at opposite ends of the aperture 114 for supporting respective ends of the panel 122 when seated in the aperture 114.

Referring to FIG. 1, a plurality of display containers 140 are positionable atop the panel 122. At least a portion of each display container 140 is transparent to permit viewing of one or more articles containable therein for display. In the example illustrated, each container 140 has a container body enclosing an interior of the container in which the articles are contained. The body has a bottom portion 142 and a top portion 144 (in the form of a lid in the example illustrated) detachably mounted to the bottom portion 142 to enclose the interior. Each container 140 can be tamper-proof to prevent patrons from touching the articles being displayed. In the example illustrated, the top portion 144 is locked to the bottom portion 142 (e.g. through one or more fasteners, snap-fit members, friction fit, etc.), and is selectively unlockable and detachable from the bottom portion 142 for inserting and removing the articles into and out from the container 140. In the example illustrated, the top portion 144 of each container 140 has a lens 146 extending over the interior of the container body to facilitate viewing of the articles therein. In the example illustrated, each container 140 further includes one or more scent ports passing through the container body for sampling an aroma of the articles in the container 140. In the example illustrated, the scent ports are covered by a removable plug 148 for covering and uncovering the scent ports. The containers 140 can be similar to those disclosed in, for example, U.S. Pat. No. 9,630,747 (Smith et al.) and/or U.S. Pat. No. 11,235,909 (Smith et al.), each of which is hereby incorporated herein by reference in its entirety.

Figure 5:
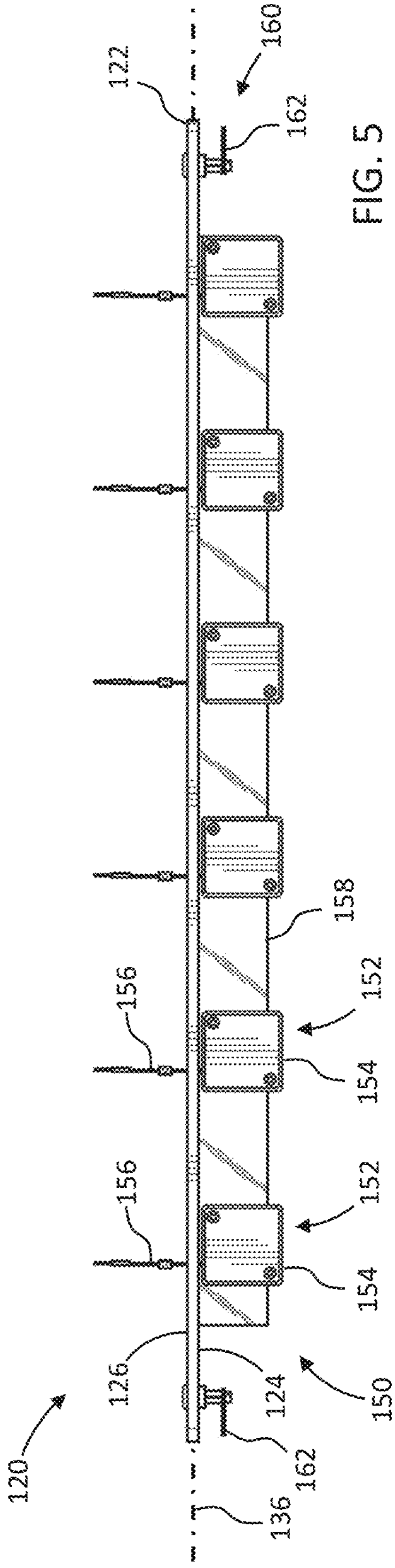
FIG. 5 is a front elevation view of the insert portion of FIG. 3.

Referring to FIG. 5, in the example illustrated, the display insert 120 further includes a tether system 150 mounted under the panel 122 for fastening the display containers 140 to the panel 122. The tether system 150 includes a plurality of retractable tethers 152 extendable through the at least one tether port 128 to the outside environment for attachment to respective display containers 140 atop the panel 122. Each tether 152 permits limited movement of a respective display container 140 away from the panel 122 to facilitate closer inspection of the articles in the container 140, and each tether 152 urges the display container 140 back toward the top surface 126 of the panel 122.

In the example illustrated, each tether 152 includes a retraction mechanism 154 under the panel 122 and positioned in the interior 108 of the housing when the panel 122 is seated in the aperture 114. Each tether 152 has a tether line 156 (in the form of a cable, in the example illustrated) extendable from the retraction mechanism 154 through the at least one tether port 128 for attachment to a respective container 140. A distal end of the tether 152 can be secured to an underside of the display container 140 through, for example, a loop and fastener connection, adhesive, and/or in any other suitable manner.

In the example illustrated, the tether line 156 is urged back into the retraction mechanism 154 (e.g. through a spring-loaded reel) for returning the display container 140 back toward the panel 122. In the example illustrated, a rail 158 (in the form of a mounting plate, in the example illustrated) extends lengthwise along the panel axis 136, and is attached to the bottom surface 124 of the panel 122. The tethers 152 are attached to the rail 158 for coupling the tethers to the panel 122. The rail 158 can also provide increased rigidity to the insert 120. In the example illustrated, the rail 158 is spaced horizontally inwardly from the periphery of the panel 122 toward a center of the panel 122.

Figure 3:
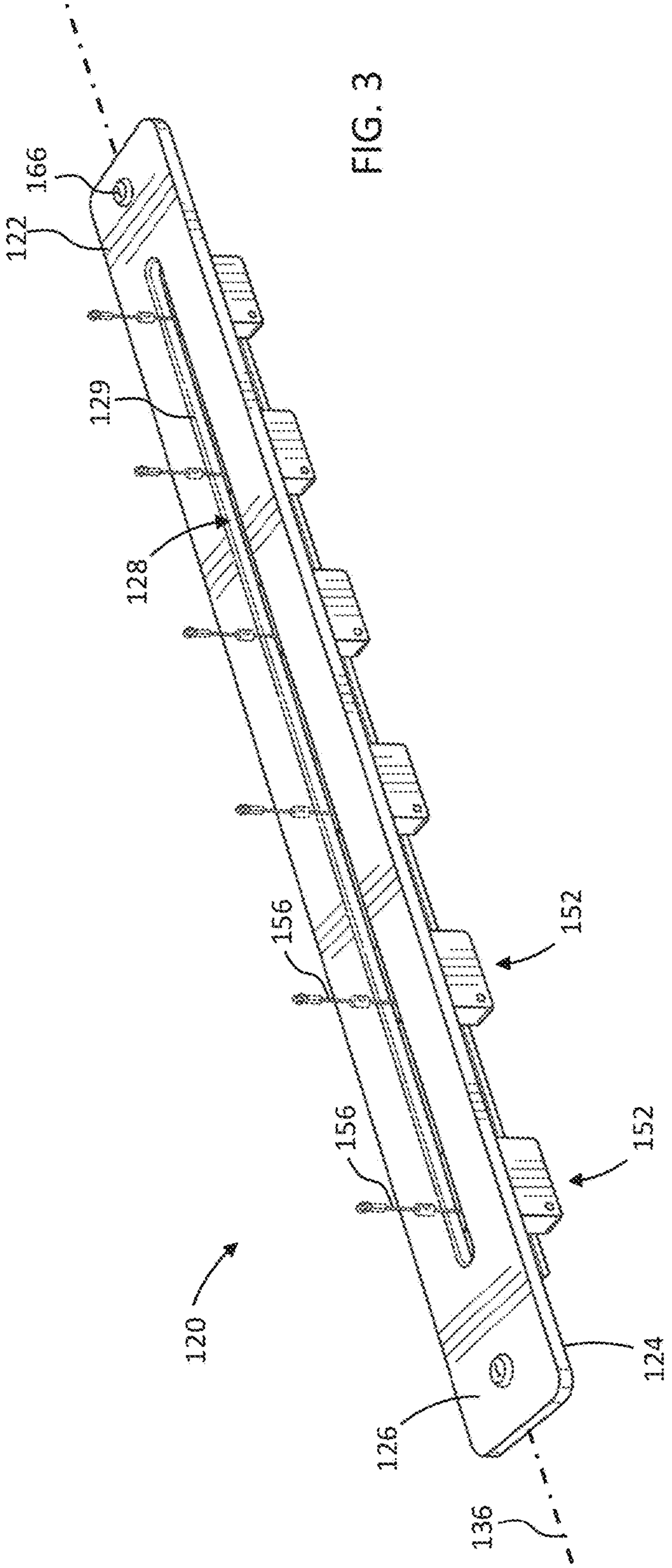
FIG. 3 is a perspective view of an insert portion of the display system of FIG. 1.
Figure 4:
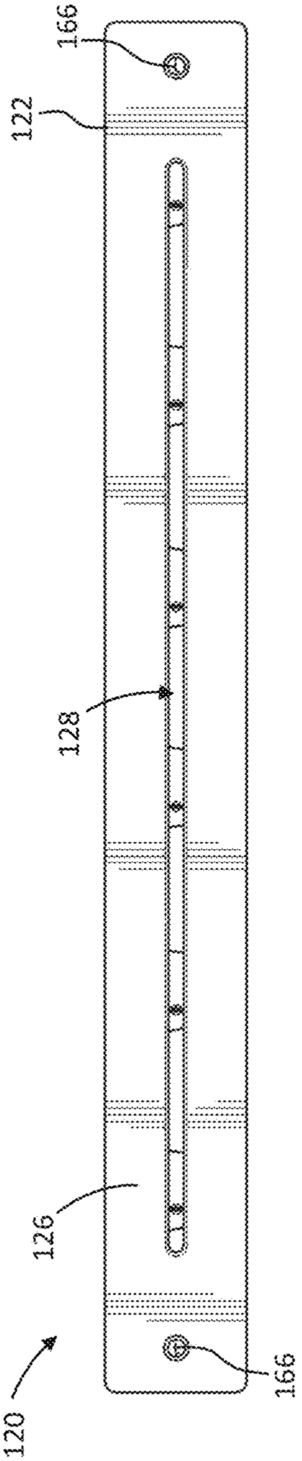
FIG. 4 is a top view of the insert portion of FIG. 3.

Referring to FIG. 3, in the example illustrated, the panel 122 includes a single tether port 128 in the form of a continuous panel slot 129 extending along the panel axis 136 and through which all of the tether lines 156 extend. In the example illustrated, the panel slot 129 extends over most of the length of the panel 122.

Referring to FIG. 7, in the example illustrated, the display insert 120 further includes a locking mechanism 160 for selectively locking and unlocking the panel 122 to and from the countertop 102. In the example illustrated, the locking mechanism 160 is configurable between a locked position and an unlocked position. When the locking mechanism 160 is in the locked position (shown in FIG. 7), the panel 122 is securely locked to the countertop 102 when seated in the aperture 114 to prevent detachment of the panel 122 from the countertop 102. When the locking mechanism 160 is in the unlocked position, the panel 122 is unlocked from the countertop 102 to permit removal of the panel 122 from the aperture 114 for transporting the panel 122, tether system 150, and display containers 140 together away from the countertop 102 (e.g. for secure storage in a portion of the interior 108 of the housing and/or other secure location).

In the example illustrated, the locking mechanism 160 includes at least one latch 162 movably coupled to one of the panel 122 and the countertop 102 and a respective strike surface 164 fixed to the other one of the panel 122 and the countertop 102. In the example illustrated, the at least one latch 162 is coupled to the panel 122 and the respective strike surface 164 is fixed relative to the countertop 102. Each latch 162 is clear of the respective strike surface 164 when the locking mechanism 160 is in the unlocked configuration. Each latch 162 is positioned for engagement with the strike surface 164 to inhibit detachment of the panel 122 when the locking mechanism 160 is in the locked configuration. In the example illustrated, the locking mechanism 160 comprises a pair of latches 162 and respective strike surfaces 164, with each latch 162 and respective strike surface 164 positioned adjacent a respective end of the panel 122 when the panel is seated in the aperture. In the example illustrated, the underside of each ledge 130 serves as the respective strike surface 164.

In the example illustrated, the locking mechanism 160 is key-operated, and includes a key slot 166 for receiving a key to move a respective latch 162 between the locked and unlocked positions. In the example illustrated, the latches 162 and respective key slots 166 are mounted to the panel 122, with each key slot 166 on the top surface 126 of the panel 122 and each latch 162 under the bottom surface 124 of the panel 122 (and in the interior 108 when the panel 122 is seated in the aperture 114).

Figure 8:
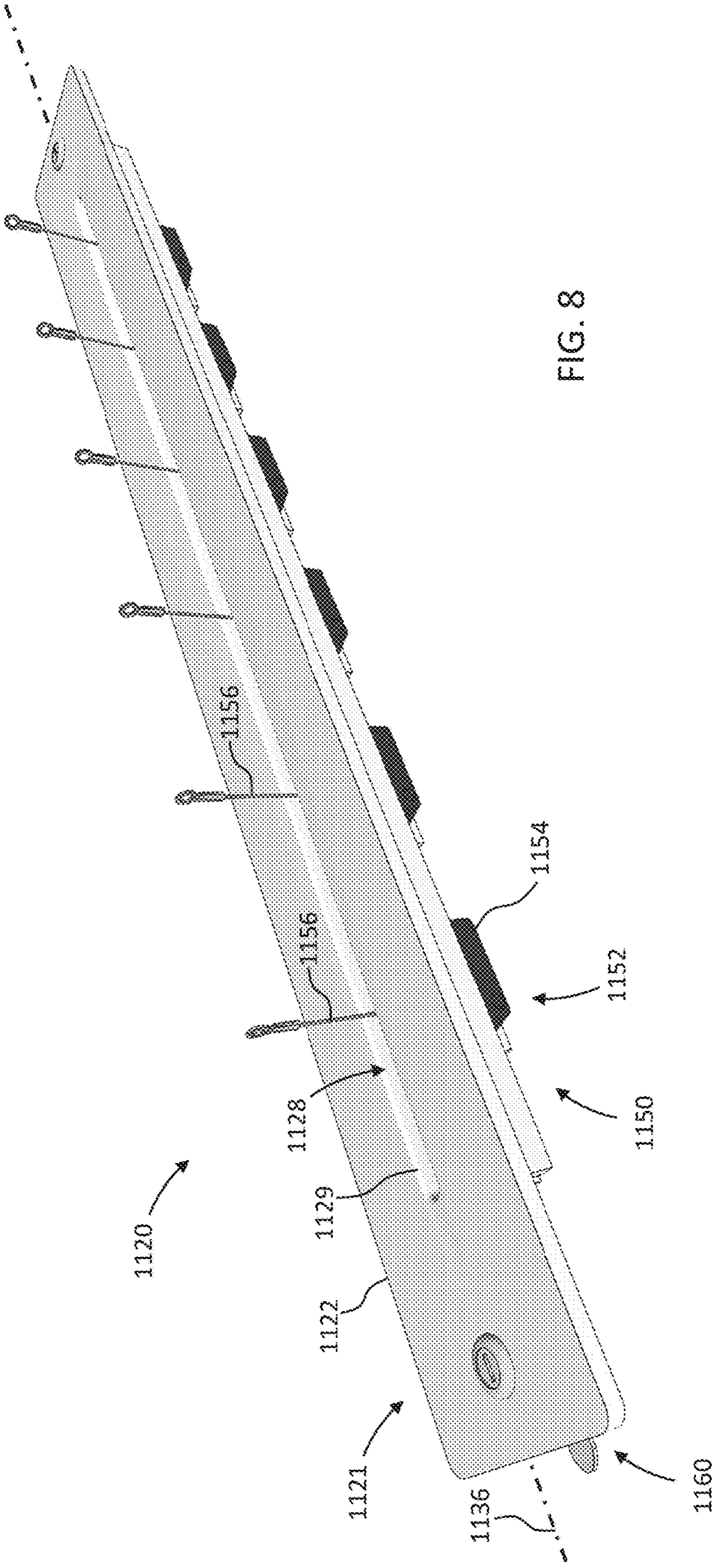
FIG. 8 is a perspective view from the top and front of another example display insert.

Referring to FIG. 8, another example display insert 1120 for a display system like the system 100 is illustrated. The display insert 1120 has similarities to the insert 120, and like features are identified using like reference characters, incremented by 1000.

In the example illustrated, the display insert 1120 includes a cover 1121 positionable over an opening (e.g. like the aperture 114) to an interior of a housing (e.g. like the housing 101). In the example illustrated, the cover 1121 is in the form of a panel 1122 extending along an axis 1136. The panel 1122 has at least one tether port 1128 passing through the panel 1122. When the insert 1120 is mounted, the at least one tether port extends between the interior of the housing and an exterior environment. In the example illustrated, the at least one tether port 1128 comprises a slot 1129 extending continuously along the axis 1136.

In the example illustrated, a locking mechanism 1160 (e.g. including one or more rotatable latches) is coupled to the panel 1122 for selectively locking and unlocking the panel 1122 relative to the housing.

Figure 9:
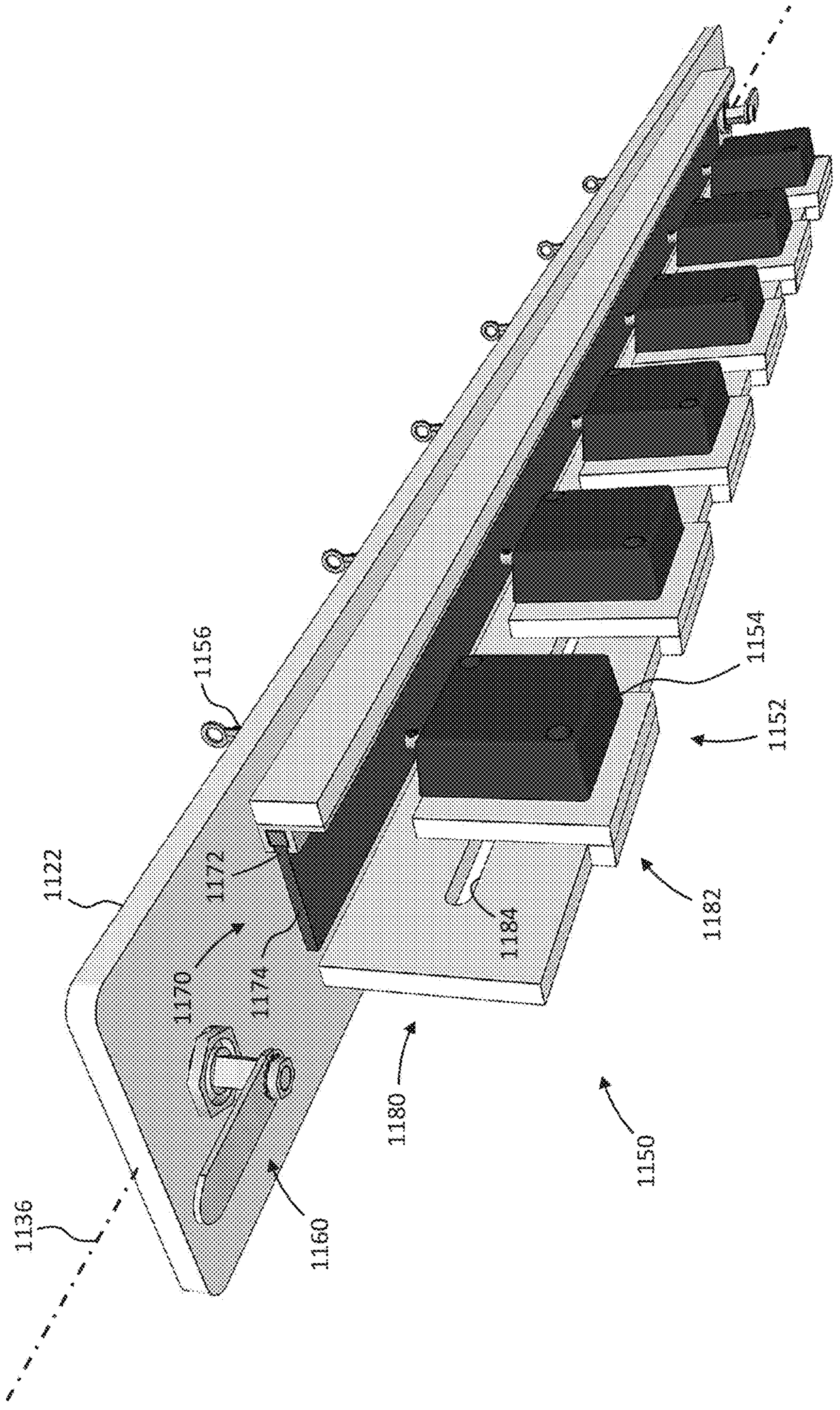
FIG. 9 is a perspective view from the bottom and front of the display insert of FIG. 8.

Referring to FIG. 9, in the example illustrated, a tether system 1150 is attached to an underside of the panel 1122. The tether system 1150 includes a plurality of retractable tethers 1152 spaced apart from each other along the axis 1136. Each tether 1152 includes a retraction mechanism 1154 under the panel 1122 (and positioned in the interior of the housing when the insert 1120 is mounted), and a tether line 1156 extendable from the retraction mechanism 1154 through the slot 1129 for attachment to a respective display container (e.g. like the container 140) in the exterior environment and positionable atop the panel 1122. Referring to FIG. 8, in the example illustrated, all the tether lines 1156 extend through the same slot 1129.

Referring to FIG. 9, in the example illustrated, the insert 1120 includes a slot cover 1170 extending along and across an entirety of the slot 1129 to limit visibility of the interior of the housing through the slot 1129, while accommodating extension of the tether lines 1156 therethrough. In the example illustrated, the slot cover 1170 comprises a strip brush 1172 mounted under the panel 1122 and having bristles 1174 projecting transversely across the slot 1129 and between which the tether lines 1156 extend.

Figure 10:
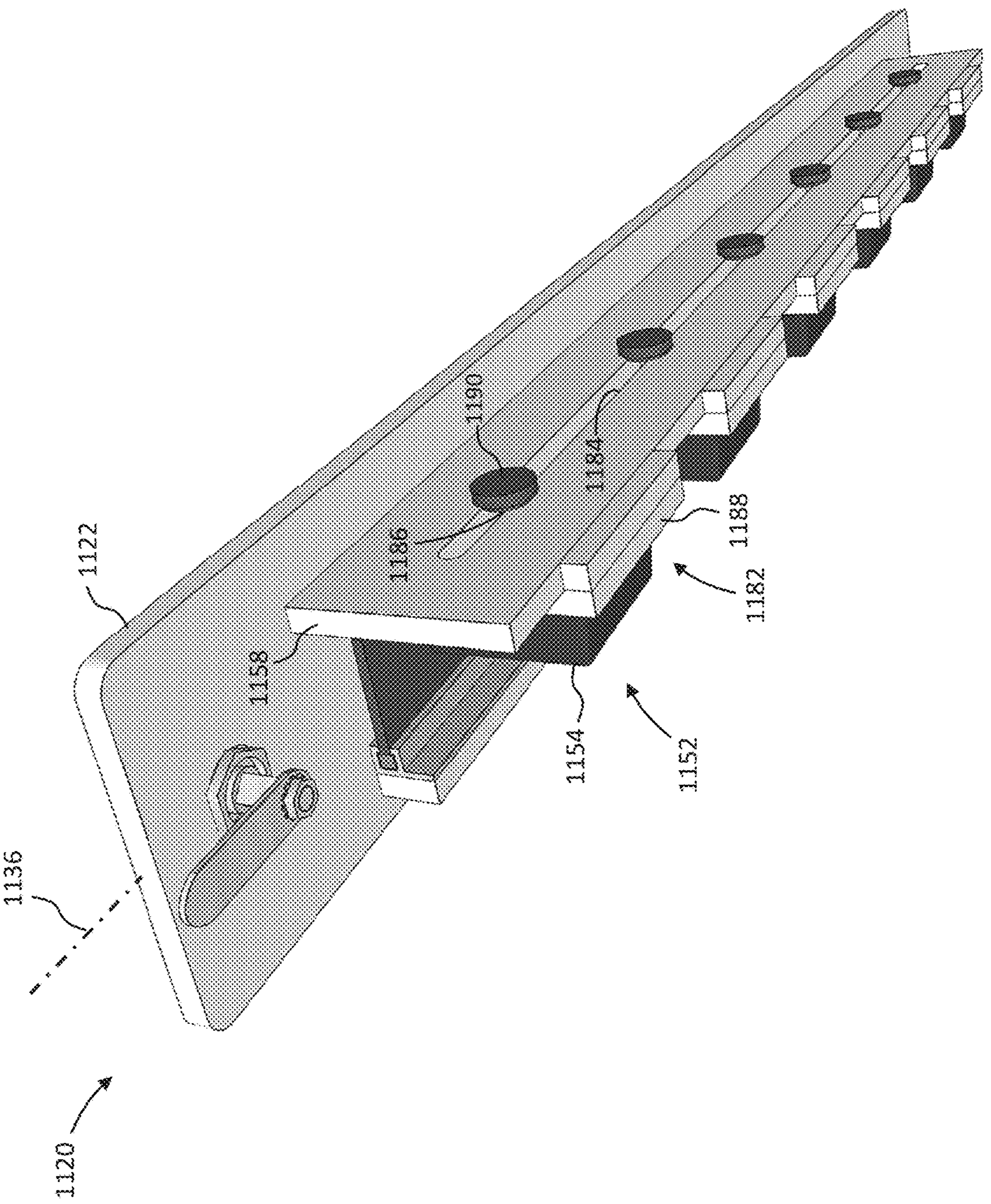
FIG. 10 is a perspective view from the bottom and rear of the display insert of FIG. 8.
Figure 11:
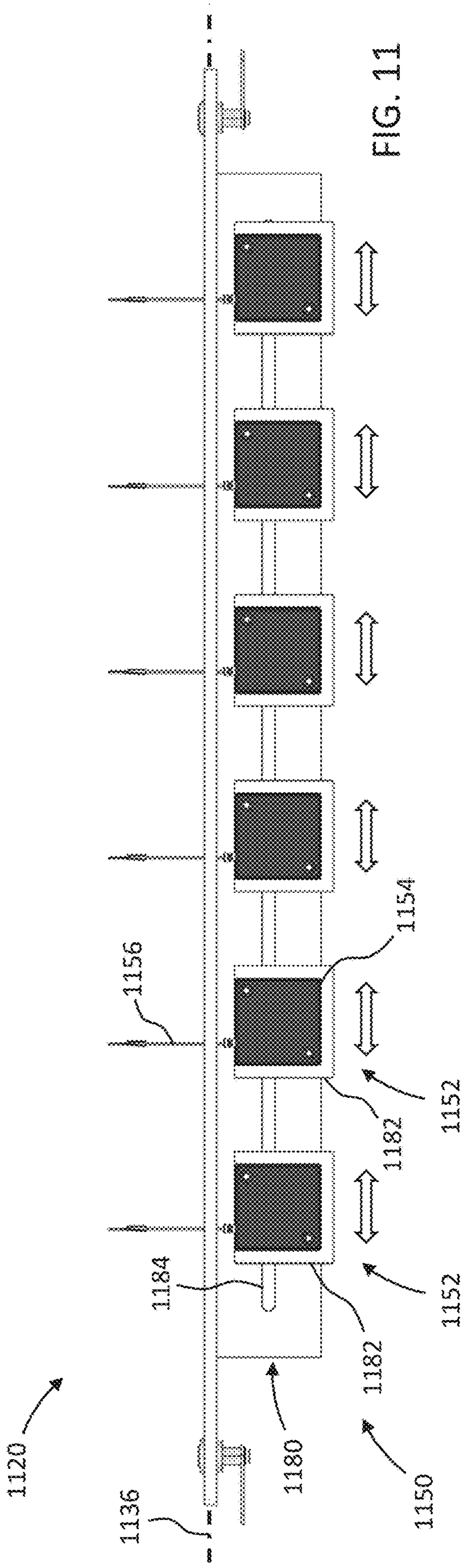
FIG. 11 is a front elevation view of the display insert of FIG. 8, with a plurality of tethers shown coupled at respective axial positions.
Figure 12:
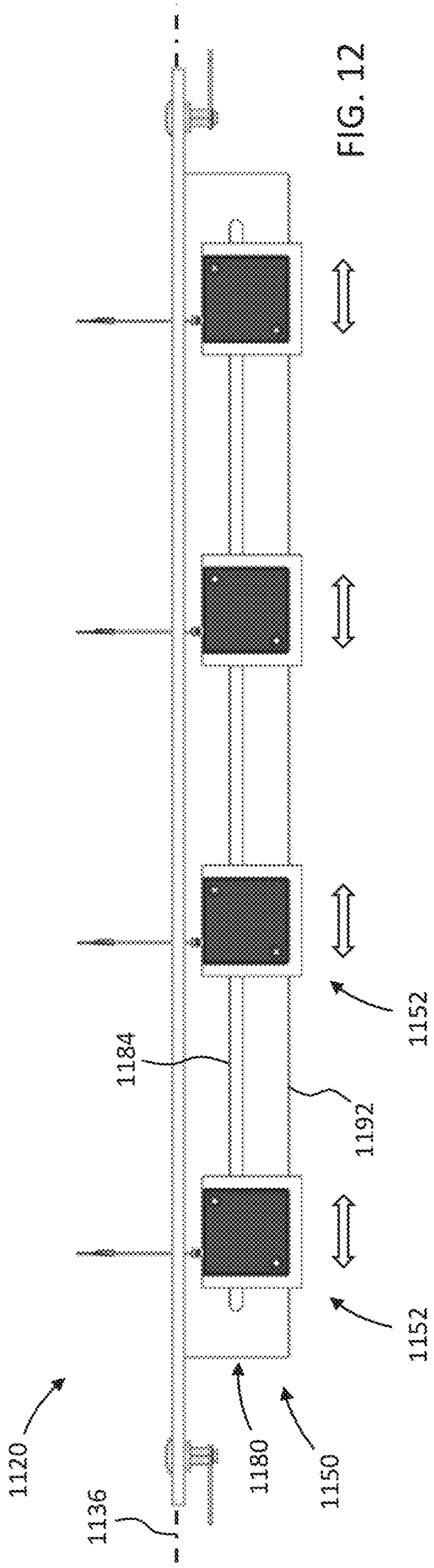
FIG. 12 is a front elevation view like that of FIG. 11, but with an adjusted quantity and axial positioning of the tethers.

Referring to FIGS. 11 and 12, in the example illustrated, each retraction mechanism 1154 is adjustably coupled to the panel 1122 to permit adjustment of an axial position of each tether 1152 along the axis 1136. Referring back to FIG. 9, in the example illustrated, the tether system 1150 includes a track 1180 under the panel 1122 and extending along the axis 1136. Each tether 1152 is slidably coupled to the track 1180 and selectively translatable therealong relative to the panel 1122 for adjustment of the axial position. In the example illustrated, each tether 1152 is slidably coupled to the track 1180 through a respective slider 1182 mounted to the track 1180 for sliding therealong. In the example illustrated, the retraction mechanism 1154 of each tether 1152 is fixed to translate with the slider 1182 along the track 1180. In the example illustrated, the track 1180 comprises a track slot 1184 extending along the axis 1136. Referring to FIG. 10, each slider 1182 has a guide 1186 received in the track slot 1184 for guiding translation of the tether 1152 along the track 1180.

In the example illustrated, the track 1180 comprises a rail 1158 under the panel 1122 and in which the track slot 1184 is formed. In the example illustrated, the track slot 1184 passes horizontally through the rail 1158. Each slider 1182 comprises a slide block 1188 to which the retraction mechanism 1154 is attached. The slide block 1188 is positioned against a first side of the rail 1158. Each slider 1182 further includes a threaded fastener 1190 (e.g. a thumb screw) on a second side of the rail 1158 horizontally opposite the first side. The fastener 1190 extends through the track slot 1184 into threaded engagement with the slide block 1188 (e.g. into a threaded insert 1191 (FIG. 14) in the slide block 1188). The fastener 1190 serves as a tether lock operable to lock and unlock the tether 1152 relative to the panel 1122 to inhibit and permit, respectively, adjustment of the axial position along the axis 1136. When tightened, the fastener 1190 locks the tether 1152 at a respective axial position. When loosened, the fastener 1190 unlocks the tether 1152 and serves as the guide 1186 for adjustment of the axial position.

In the example illustrated, each tether 1152 is detachably coupled to the panel 1122 to permit detachment and reattachment of each tether 1152 from and to the panel 1122. This can permit adjustment of a total quantity of tethers 1152 of the insert 1120 (see e.g. FIG. 12 showing four tethers 1152 compared to FIG. 11 showing six tethers 1152). In the example illustrated, the fastener 1190 is removable from the slide block 1188 to permit detachment of the tether 1152.

Figure 14:
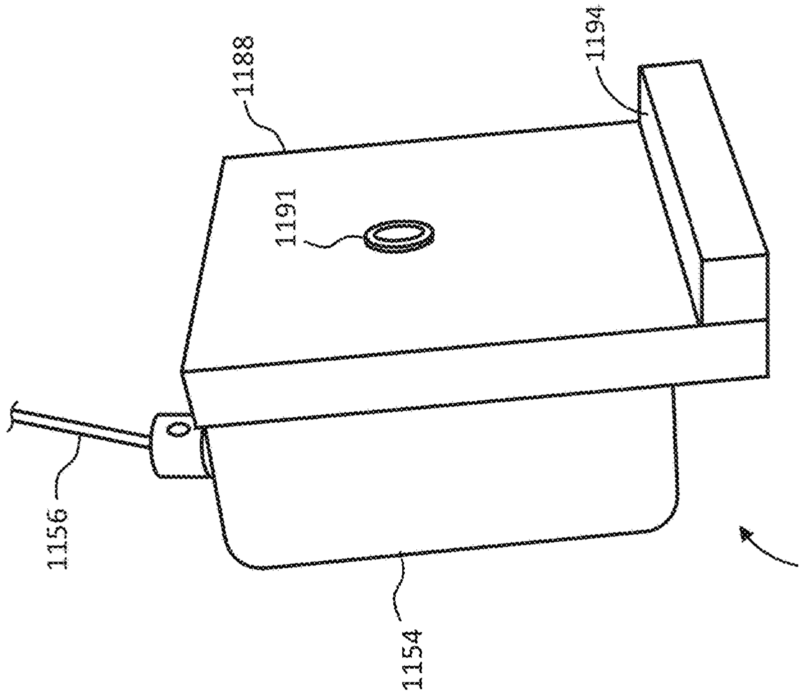
FIG. 14 is an enlarged perspective view of portions of a tether assembly of the display insert of FIG. 8.
Figure 13:
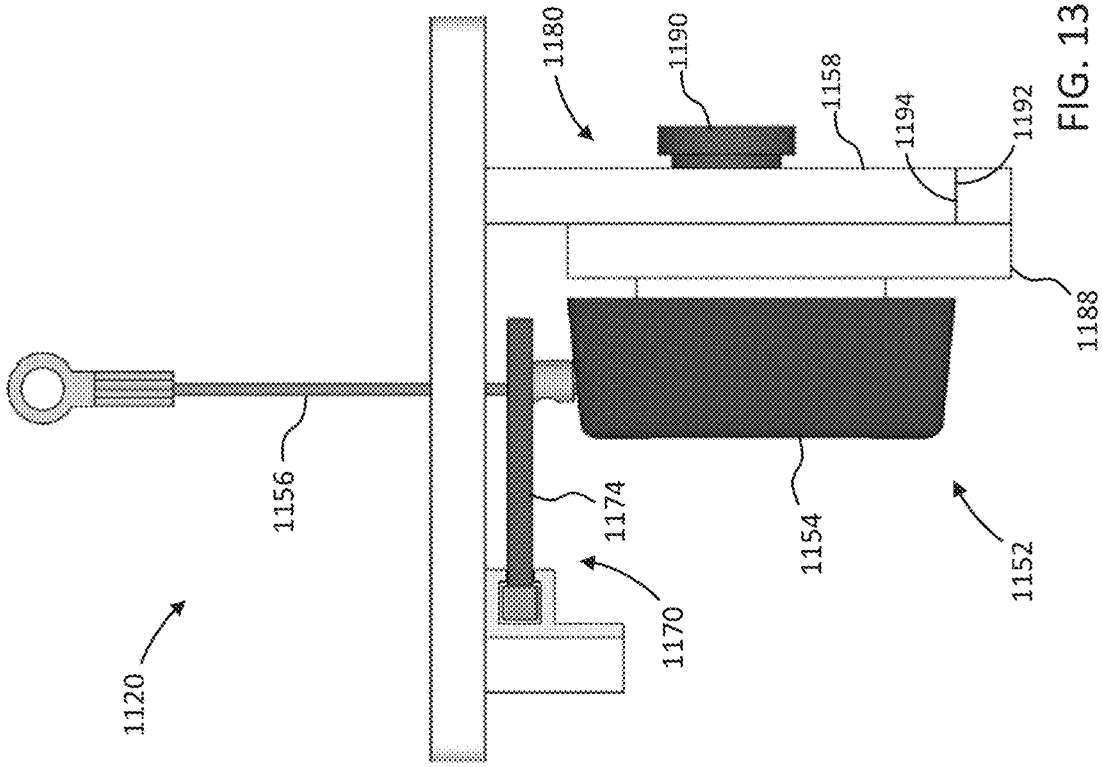
FIG. 13 is a side elevation view of the display insert of FIG. 8.

Referring to FIGS. 13 and 14, in the example illustrated, the track 1180 has a slide surface 1192 spaced apart from and extending parallel with the track slot 1184 (FIG. 12). The slide block 1188 has an anti-rotate surface 1194 spaced transversely apart from the fastener 1190 for sliding engagement with the slide surface 1192 to inhibit rotation of the slide block 1188 relative to the track 1180. In the example illustrated, the slide surface 1192 comprises a bottom edge of the rail 1158, and the anti-rotate surface 1194 comprises a lip of the slide block 1188 projecting under and adjacent the bottom edge of the rail 1158.

The invention claimed is:

1. A countertop display system for securing display containers, comprising:

a) a countertop mountable atop a cabinet in a generally horizontal orientation, the countertop having a countertop underside surface for facing an interior of the cabinet, a worksurface opposite the underside surface for facing an outside environment, and an aperture passing vertically through the countertop from the worksurface to the underside surface;

b) a display insert detachably mountable in the aperture of the countertop, the display insert including:

i) a panel positionable in the aperture for covering the aperture, the panel having a bottom surface for facing the interior of the cabinet, a top surface opposite the bottom surface for facing the outside environment, and at least one tether port passing vertically through the panel from the top surface to the bottom surface;

ii) a tether system mounted under the panel for fastening the display containers to the panel, the tether system including a plurality of retractable tethers extendable through the at least one tether port to the outside environment for attachment to respective display containers, each tether permitting limited movement of a respective display container away from the panel to facilitate viewing of one or more articles in the display container, and urging the display container back toward the top surface of the panel; and iii) a locking mechanism configurable between a locked position in which the panel is securely locked to the countertop when in the aperture to prevent detachment of the panel from the countertop, and an unlocked position in which the panel is unlocked from the countertop to permit removal of the panel from the aperture for transporting the panel, tether system, and display containers away from the countertop.

2. The display system of claim 1, wherein when the panel is in the aperture, the top surface of the panel is generally flush with the worksurface of the countertop.

3. The display system of claim 1, wherein the countertop has a ledge projecting horizontally into the aperture and recessed downwardly from the worksurface for supporting the panel when received in the aperture.

4. The display system of claim 1, wherein the panel is positionable in the aperture by inserting the panel into the aperture from above, and the panel is removable from the aperture by lifting the panel vertically out from the aperture.

5. The display system of claim 1, wherein the aperture has an aperture area and the worksurface has a surface area greater than the aperture area.

6. The display system of claim 1, wherein the panel extends lengthwise along a panel axis, and the at least one tether port comprises a panel slot extending continuously along the panel axis and through which the plurality of tethers extend.

7. The display system of claim 1, wherein each tether comprises a retraction mechanism under the panel and a tether line extendable from the retraction mechanism through the at least one tether port for attachment to a respective container, the tether line urged back into the retraction mechanism for returning the display container to the panel.

8. The display system of claim 1, wherein the locking mechanism comprises at least one latch movably coupled to one of the panel and the countertop and a respective strike surface fixed to the other one of the panel and the countertop, the latch clear of the strike surface when the locking mechanism is in the unlocked configuration and positioned for engagement with the strike surface to inhibit detachment of the panel when the locking mechanism is in the locked configuration.

9. The display system of claim 8, wherein the panel extends lengthwise along a panel axis between opposed ends, and the locking mechanism comprises a pair of latches and respective strike surfaces, each latch and respective strike surface positioned adjacent a respective end of the panel.

10. The display system of claim 8, wherein the latch is coupled to the panel and the strike surface is fixed to the countertop.

11. A display system for securing display containers, comprising:

a) a worksurface having an aperture passing therethrough; and b) a display insert detachably mountable in the aperture, including:

i) a panel for covering the aperture, the panel having at least one tether port extending therethrough;

ii) a tether system mounted under the panel and including a plurality of retractable tethers extendable through the at least one tether port for attachment to respective display containers positionable atop the panel; and iii) a locking mechanism for selectively locking and unlocking the panel to and from the worksurface when the panel is positioned in the aperture, wherein the panel extends lengthwise along a panel axis, and the at least one tether port comprises a panel slot extending along the panel axis and through which the plurality of tethers extend.

12. The display system of claim 11, wherein the panel is positionable in the aperture generally flush with the worksurface.

13. The display system of claim 11, wherein the panel is positionable in the aperture by inserting the panel into the aperture from above, and the panel is removable from the aperture by lifting the panel vertically out from the aperture.

14. The display system of claim 11, wherein the aperture has an aperture area and the worksurface has a surface area greater than the aperture area.

15. The display system of claim 11, wherein each tether is adjustably coupled to the panel at an axial position, the axial position adjustable along the panel axis.

16. A display insert detachably mountable in an aperture of a worksurface for securing display containers, comprising:

a) a panel for covering the aperture, the panel extending lengthwise along a panel axis and having at least one tether port extending therethrough;

b) a tether system mounted to an underside of the panel, the tether system including a plurality of retractable tethers spaced apart from each other along the panel axis and extendable through the at least one tether port for attachment to respective display containers; and c) a locking mechanism coupled to the panel for selectively locking and unlocking the panel to and from the worksurface when the panel is positioned in the aperture, wherein the panel extends lengthwise along a panel axis, and each tether is adjustably coupled to the panel at an axial position, the axial position adjustable along the panel axis.

17. The display insert of claim 16, wherein the at least one tether port comprises a panel slot extending continuously along the panel axis and through which the plurality of tethers extend.

18. The display insert of claim 17, further comprising a slot cover extending along and across the slot to limit visibility through the slot while accommodating extension of the tethers therethrough.

19. The display insert of claim 18, wherein the slot cover comprises a strip brush mounted under the panel and having bristles projecting transversely across the slot and between which the tethers are extendable.

20. The display insert of claim 16, wherein the locking mechanism comprises at least one latch movably coupled to the panel for engagement with a strike surface fixed relative to the worksurface to lock the panel to the worksurface, and movable clear of the strike surface to unlock the panel from the worksurface.

21. The display insert of claim 16, wherein the display insert includes the display containers, each display container attached to a respective tether atop the panel.

22. The display insert of claim 16, wherein each tether includes a respective tether lock operable to lock and unlock the tether relative to the panel to inhibit and permit, respectively, adjustment of the axial position along the panel axis.

23. The display insert of claim 22, wherein the tether system includes a track under the panel and extending along the panel axis, each tether slidably coupled to the track and selectively translatable therealong relative to the panel for adjustment of the axial position.

24. The display insert of claim 23, wherein the track comprises a track slot extending along the panel axis, and each tether has a guide received in the track slot for guiding translation of the tether along the track.

25. The display insert of claim 16, wherein each tether is detachably coupled to the panel to permit detachment and reattachment of each tether from and to the panel for adjusting a total quantity of tethers coupled to the panel.

26. The display system of claim 1, wherein the panel is positionable in the aperture generally coplanar with the countertop.

* * * * *